(12) United States Patent
Radin

(10) Patent No.: US 10,315,309 B2
(45) Date of Patent: Jun. 11, 2019

(54) MODULAR SNAKE ARM WITH ARTICULATED DRIVE SHAFT

(71) Applicant: Lon Radin, Palo Alto, CA (US)

(72) Inventor: Lon Radin, Palo Alto, CA (US)

(*) Notice: Subject to any disclaimer, the term of this patent is extended or adjusted under 35 U.S.C. 154(b) by 0 days.

(21) Appl. No.: 15/458,982

(22) Filed: Mar. 15, 2017

(65) Prior Publication Data
US 2017/0266806 A1   Sep. 21, 2017

Related U.S. Application Data

(60) Provisional application No. 62/308,477, filed on Mar. 15, 2016.

(51) Int. Cl.
*B25J 9/08* (2006.01)
*B25J 9/06* (2006.01)
(Continued)

(52) U.S. Cl.
CPC .............. *B25J 9/08* (2013.01); *B25J 9/0021* (2013.01); *B25J 9/06* (2013.01); *B25J 9/065* (2013.01); *B25J 9/102* (2013.01); *B25J 9/1005* (2013.01); *B25J 9/109* (2013.01); *B25J 9/126* (2013.01); *B25J 17/0208* (2013.01); *B25J 18/00* (2013.01); *B25J 19/0091* (2013.01); *F16H 15/38* (2013.01); *G08C 17/02* (2013.01)

(58) Field of Classification Search
CPC . B25J 18/00; B25J 18/005; B25J 18/04; B25J 9/0021; B25J 9/06; B25J 9/065; B25J 9/08; B25J 9/10; B25J 9/1005; B25J 9/102; B25J 9/106; B25J 9/109; B25J 9/126; B25J 17/0208; B25J 19/0091; F16H 15/38

USPC ........ 74/490.03, 490.01; 901/19, 20, 23, 25, 901/27, 28
See application file for complete search history.

(56) References Cited

U.S. PATENT DOCUMENTS 7,395,606 B2 * 7/2008 Crampton .............. B25J 13/088
33/503
8,414,246 B2 * 4/2013 Tobey ...................... B25J 5/007
414/680
(Continued)

FOREIGN PATENT DOCUMENTS

FR      1496094 A  *  9/1967  ................ B25J 9/06
SU      422580 A2  *  4/1974  ................ B25J 9/06

OTHER PUBLICATIONS

Welkar, D.S., Prof. P.G. Damle and K.A. Patil. "Review of Free Ball traction Drive for CVT." International Journal of Research in Advent Technology 3.12 (2015): 6. Nov. 9, 2018. <http://www.ijrat.org/downloads/Vol-3/dec-2015/paper%20id-312201520.pdf>. (Year: 2015).*

*Primary Examiner* — Victor L MacArthur
*Assistant Examiner* — Joseph Brown
(74) *Attorney, Agent, or Firm* — Tiburon Intellectual Property, PLLC; Frank M. Washko

(57) ABSTRACT

A modular robotic snake-arm assembly is described which is animated principally by an articulated drive shaft that threads the length of the snake-arm. The articulated drive shaft is driven by a motor in the fixed base. One or more clutch mechanisms in each segment couple with the articulated drive shaft so as to cause all snake arms further from the base to reorient in either one or two angles, in either direction. Snake-arm segments can be coupled end-to-end to form a robotic snake arm of great length.

16 Claims, 18 Drawing Sheets

(51) Int. Cl.

| | |
|---|---|
| *B25J 18/00* | (2006.01) |
| *B25J 9/10* | (2006.01) |
| *B25J 9/12* | (2006.01) |
| *B25J 9/00* | (2006.01) |
| *B25J 17/02* | (2006.01) |
| *F16H 15/38* | (2006.01) |
| *G08C 17/02* | (2006.01) |
| *B25J 19/00* | (2006.01) |

(56) References Cited

U.S. PATENT DOCUMENTS

| | | | | |
|---|---|---|---|---|
| 2005/0029978 | A1* | 2/2005 | Oleynikov | B25J 9/065 |
| | | | | 318/568.12 |
| 2010/0234985 | A1* | 9/2010 | Shuren | G07D 9/00 |
| | | | | 700/223 |
| 2012/0207538 | A1* | 8/2012 | Rizk | B25J 15/04 |
| | | | | 403/315 |
| 2013/0125696 | A1* | 5/2013 | Long | B25J 18/04 |
| | | | | 74/490.05 |
| 2015/0321348 | A1* | 11/2015 | Rollinson | B25J 9/065 |
| | | | | 700/253 |
| 2016/0151910 | A1* | 6/2016 | Sanatkar | B25J 9/0075 |
| | | | | 74/490.03 |
| 2018/0021945 | A1* | 1/2018 | Pettersen | B25J 9/065 |
| | | | | 700/245 |

\* cited by examiner

US 10,315,309 B2

MODULAR SNAKE ARM WITH ARTICULATED DRIVE SHAFT

CROSS-REFERENCE TO RELATED APPLICATION

This application claims priority benefit of U.S. Provisional Patent Application No. 62/308,477 entitled "Modular Snake Arm with Articulated Drive Shaft," filed Mar. 15, 2016. The disclosure in that application is incorporated herein in its entirety.

BACKGROUND AND SUMMARY

The present invention relates generally to articulated arms, and more specifically, to modular hybrid snake arms that are usable with fixed or mobile robotic devices and systems. In particular, this invention may reduce the size and weight of the modular arm segments, which, among other advantages, would allow arms of unusually long length.

A flexible, or snake arm, robot is a computerized electro-mechanical device with many features found in industrial robotic arms. The "snake" description refers to the arm's long cylindrical shape, which can move in ways that are reminiscent of a snake. The flexible snake arm is a robotic "arm" and the most basic technology has been around for several years with snake arms available commercially from several companies. Some snake arms include a fixed base, or platform, possibly even connected to the end of a larger traditional industrial robot arm, with many elements such as ribs or plates connected in series and moved by wires or cables. Typically, the distance between two edges of the rib plates is changed, and when multiplied by many plates, the combined movement causes the arm to move. The elements, ribs or plates are typically actuated by various mechanical mechanisms, such as gears, pistons, cams, and, more typically, by wires or cables.

Some prior arms include U.S. Pat. No. 7,395,606B2, "CMM Arm with Exoskeleton," (Jul. 8, 2008); U.S. Pat. App. No. 2010/0234985, "Robotic Arm with a Plurality of Articulated Segments," (Sep. 16, 2010); and U.S. Pat. No. 8,414,246, "Modular Hybrid Snake Arm," (Apr. 9, 2013).

The present invention improves on the prior art in a number of ways. As a non-limiting example, the preferred embodiment of the system is a modular robotic snake arm wherein each of the snake arm segments derives mechanical power from an articulated drive shaft that passes through the length of the snake arm. In this embodiment, the main source of mechanical power is a motor that remains attached to a base, which causes the articulated drive shaft to rotate. One or more clutch mechanisms in each snake-arm segment harness the rotational power of the articulated drive shaft to alter the orientation of all segments further from the fixed base, as opposed to the ribs or plates of the prior art, which must be actuated independently.

DETAILED DESCRIPTION

While the exemplary embodiments illustrated herein may show various features, it will be understood that the different features disclosed herein can be combined variously to achieve the objectives of the present invention.

The overall concept of the present invention is to provide a snake arm comprised of a number of segment bodies, wherein the segment bodies are actuated through the rotation of a center shaft. There are a number of different ways to achieve rotation of the segments along the length of the snake arm. However, the present invention, generally, is to selectively clutch a segment body to the rotation of the center shaft to achieve motion of the body as rotation in one or more axes.

Figure 1:
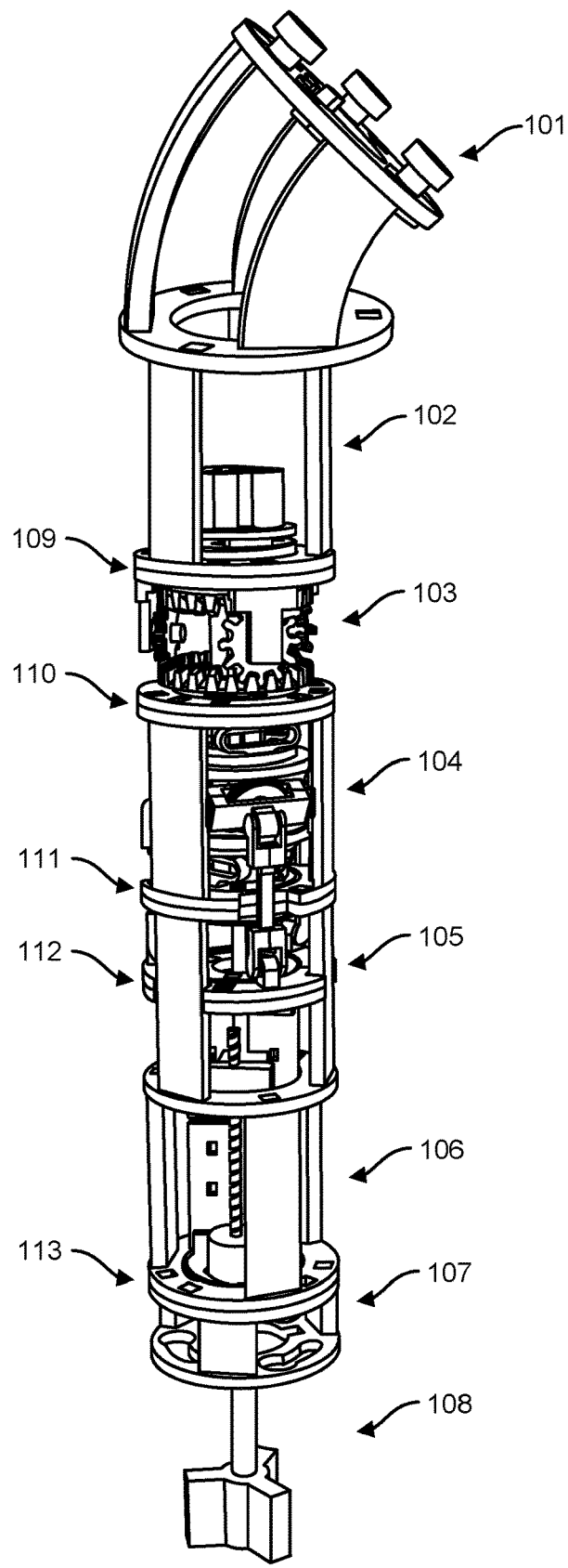
FIG. 1 shows the preferred embodiment of a single snake-arm segment. This segment consists of a single axial rotation joint, and a fixed 45-degree bend on one side of the joint. Mechanical power is derived from the articulated drive shaft by means of a toroidal variator clutch mechanism. The azimuthal angle of the next higher snake-arm is controlled whereas the angle of elevation remains at 45 degrees.

Turning to FIG. 1, this figure shows a single arm segment in one possible embodiment. In this embodiment, assembly is achieved where the top end of the segment is a male twist-lock plate 101. The bottom end of the segment is a female twist-lock plate 107. Arm segments are joined end-to-end by mating these two plates so that the knobs on the male plate 101 pass through the holes on the female plate 107, and then the two arm segments are rotated co-axially until a spring tab locks the plates in place, though other assembly methods known in the art are possible. Protruding below the bottom plate is a flexible shaft terminated in a triangular key 108. The flexible shaft may be a stiff shaft or a flexible shaft within the scope of this invention. In this embodiment, the shaft may be a flexible shaft, such as a twisted steel wire wrapped around a core of straight steel wire, for example, a common speedometer cable. The triangular key at the end of the flexible shaft 108 locks into a mating keyhole 102 at the top end of the arm segment below. When two arm segments are joined, the key 108 of the bottom end segment is inserted into the keyhole 102 of the top end segment at the same time the male twist-lock plate 102 of the top end segment is mated to the female twist-lock plate 107 of the bottom end segment.

Figure 8:
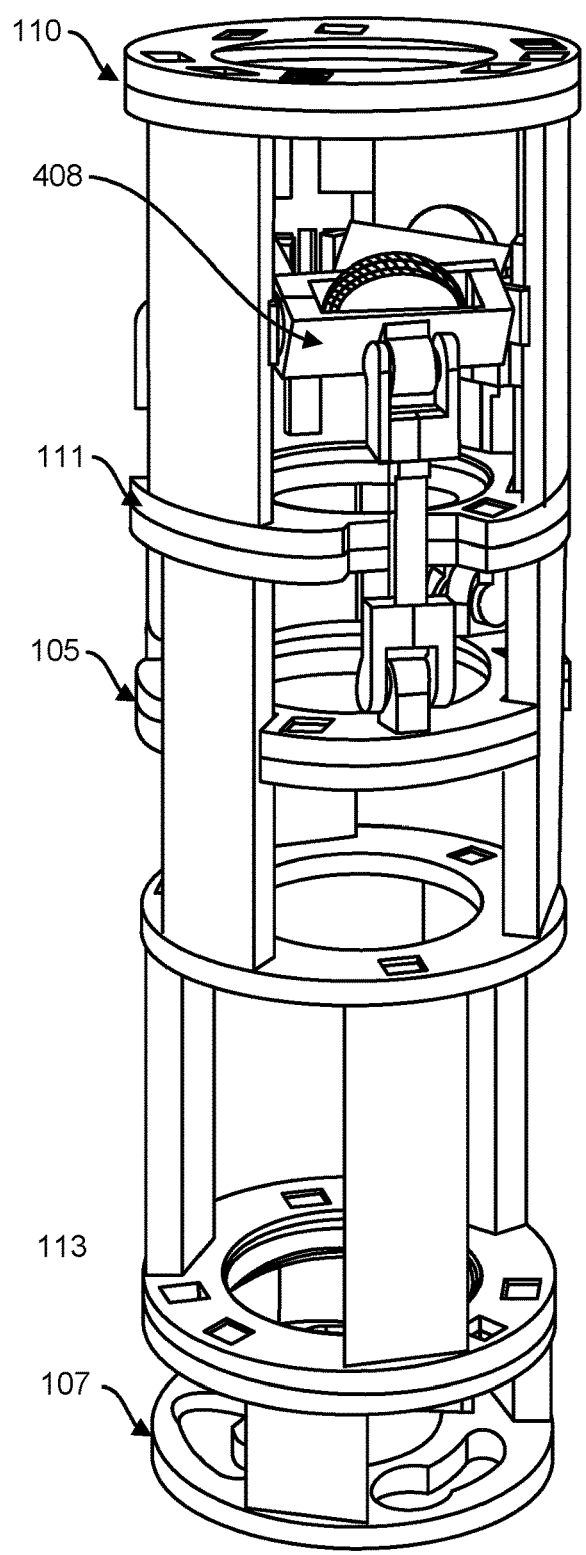
Figure 9:
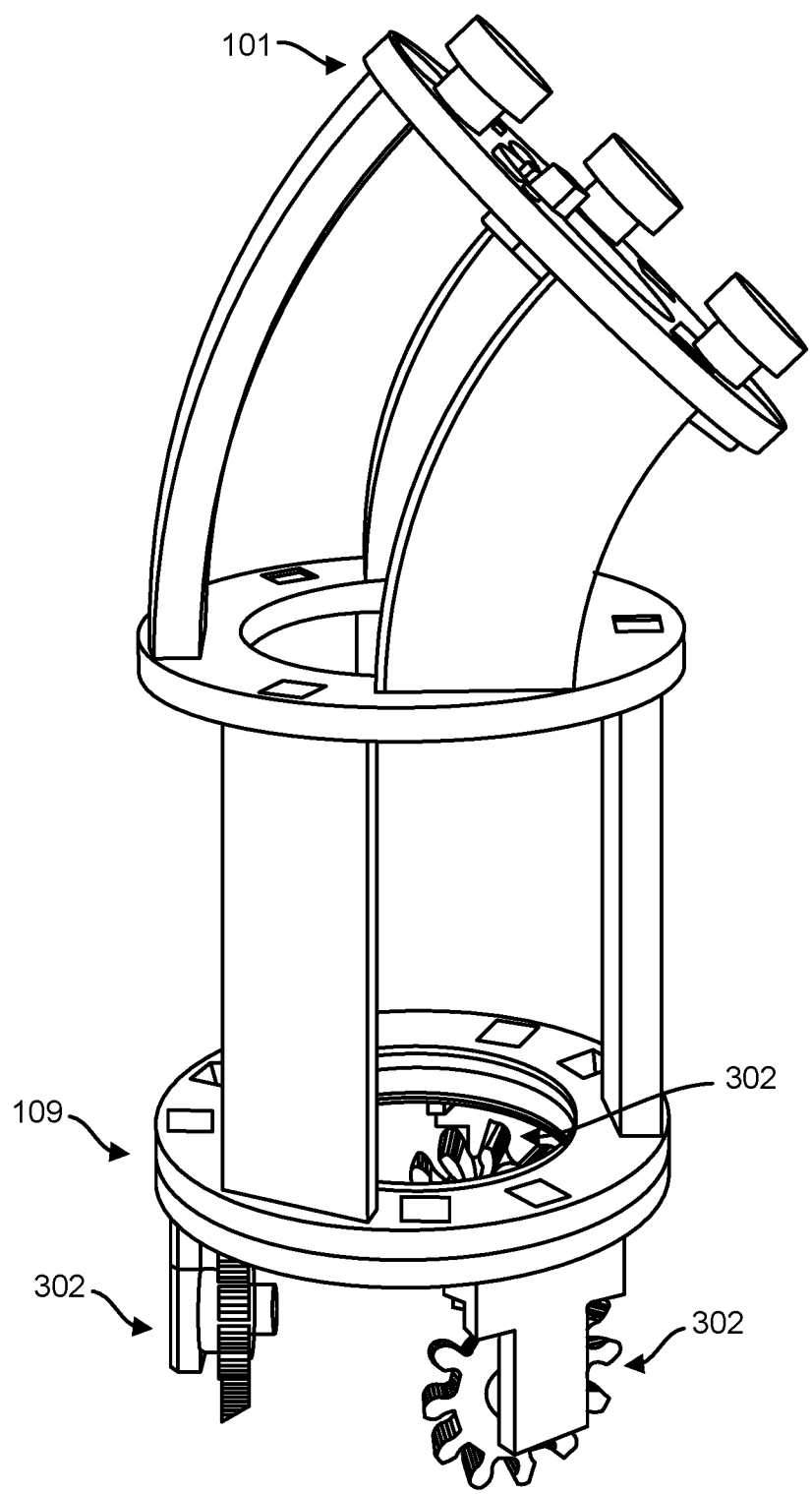
Figure 10:
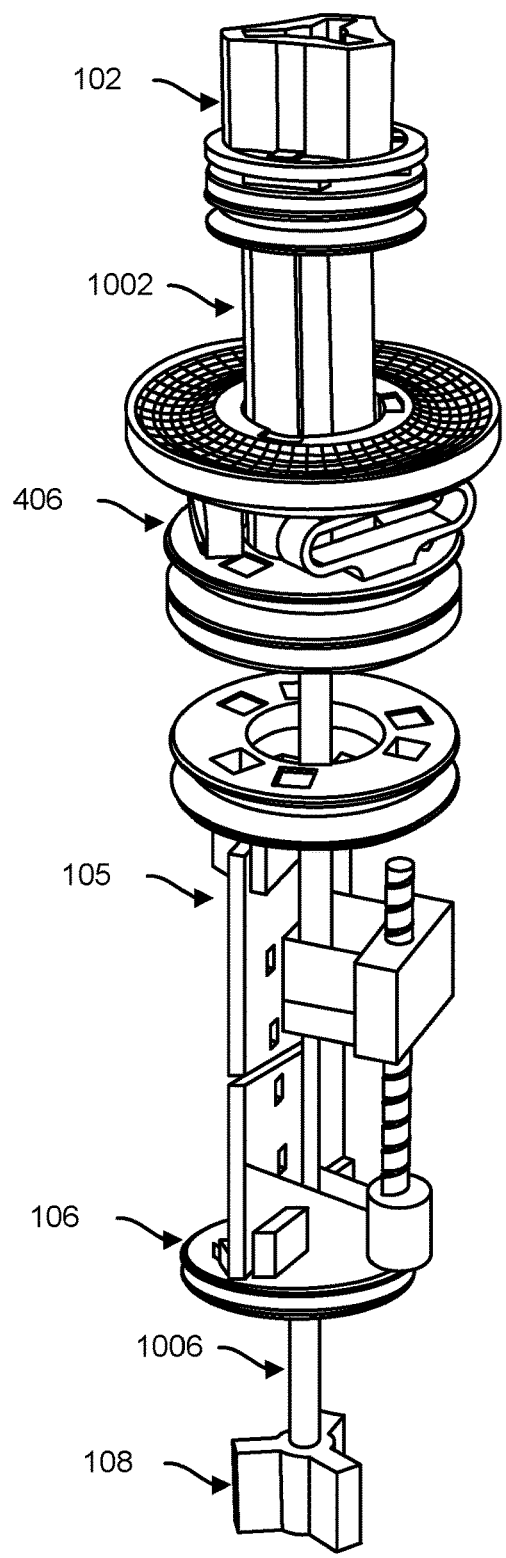

Each arm may comprise at least three types of parts: parts at the bottom which are fixed relative to the female twist-lock plate of the lower arm segment; parts at the top which are fixed relative to the male twist-lock plate of the segment itself, and parts which rotate with the driven articulated shaft. FIGS. 8, 9, and 10 show these three types of parts in isolation. To maintain structural rigidity between these three types of parts, bearings may be used. For example, in this embodiment, there are five ball bearings in each arm segment: 109, 110, 111, 112, and 113. The rotating articulated drive shaft turns the flexible shaft 108 at the bottom of the segment. However, each arm segment may also comprise other parts, as well. For example, another embodiment may further include features where the top may be a counter-revolving toroid and the bottom may be a counter-rotating differential gear, with tiltable wheels that ride on the toroidal surface. These additional components could provide different advantages, such as more precise or accurate control over body orientation, or the control of multiple body orientations. While the present embodiment may offer control over one degree of freedom of the body segment, additional components, or duplicate systems within the segment body may provide control over more than one degrees of freedom of the body segment.

To harness the rotational power of the shaft, a mechanism is used to couple this rotational motion to a rotation of the arm segment body. This can be accomplished through a number of different ways known in the art, and different mechanisms to couple the shaft motion to the body rotation are possible. In this embodiment, a toroidal continuously variable drive clutch (toroidal variator) 104 may be used to generate rotation opposite of that of the drive shaft. Depending on the position of the clutch, the body may rotate around different axes, or in a different direction, and multiple clutches may be used to achieve these various rotations. Or, opposing clutches may be used for positive rotation and the reversed rotation. Conversely, a clutch rotation may also be reversed by reversing the motion of the shaft.

It is possible for the clutch to be a simple linear clutch within the spirit of this invention. This clutch may be a simple clutch, coupled with bearings, gears, and other mechanical components to transmit the shaft motion into rotational motion of the segment body. Or a variable clutch may be used, to vary the speed of rotation of the segment body. Or it may be a variable speed transmission. For the purposes of this disclosure, any of these terms will be used interchangeably to mean the mechanism to selectively couple motion to the shaft. In either case, it is possible to actuate the clutch in a number of different ways, including mechanical or electrical methods known in the art. In the present embodiment, this toroidal variator 104 may be controlled by a small electric motor screw actuator 106 and a sliding ball bearing 105 which tilt the angle of the tiltable wheels within the toroidal variator. The toroidal variator 104 causes the inner race of ball bearing 110 to rotate with a rate either faster or slower that the articulated drive shaft, and in the direction opposite of that of the drive shaft. In this embodiment, the rotation rates are variable. The rate of rotation of the inner race of ball bearing 110 may be either: the same as the drive shaft if the tiltable wheels are vertical); faster than the drive shaft if the tiltable wheels lean out); or slower than the drive shaft (if the tiltable wheels lean in).

Not shown in FIG. 1 is a microcontroller next to the electric motor 106 that controls the motor in response to commands received from the operator of the arm assembly. In another embodiment, the microcontroller may be remote from the motor, but transmitting signals to the electric motor.

The inner race of ball bearing 110 may be rigidly attached to the bottom gear of a differential gear set 103. The inner race of ball bearing 109 is rigidly attached to the top gear of the differential 103 and to the articulated drive shaft. The differential gear set causes the outer race of ball bearing 109 to rotate at the rate which is the difference of the rotational rates of the bottom differential gear and top differential gear. The outer race of ball bearing 109 is rigidly connected to the male twist-lock plate 101 at the top of the arm segment. As a result, relative to the bottom parts of the arm segment, the top parts of the arm segment can either: remain fixed (if the tiltable wheels are vertical); rotate in the same direction as the articulated drive shaft (if the tiltable wheels lean out); or rotate in the opposite direction as the articulated drive shaft (if the tiltable wheels lean in).

Figure 2:
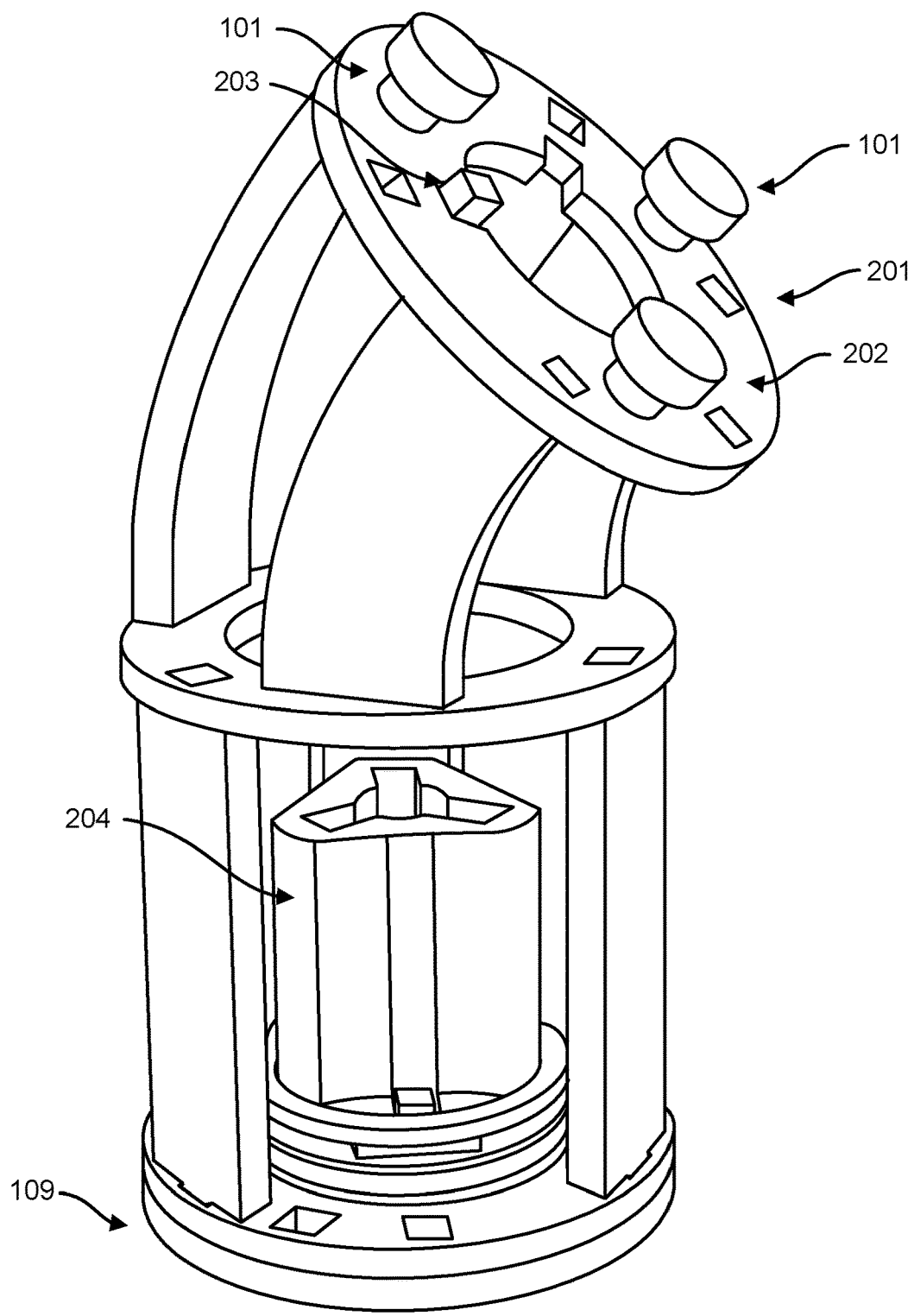
FIGS. 2 through 10 show details of the preferred embodiment of the single snake-arm segment of FIG. 1. Two important components in these embodiments are the toroidal variator, and the differential gear set.

Turning to FIG. 2, this figure shows in more detail the top of the arm segment. The male twist-lock plate 101 is attached rigidly to the outer race of ball bearing 109. The keyhole 204 is attached rigidly to the inner race of ball bearing 109. A number of button-pegs 202 may protrude from the flat surface of the twist-lock plate. The button-pegs 202 engage mating button-holes in the female twist-lock plate of the next higher snake-arm segment. A spring-tab 203 pops into a mating notch to lock the twist-lock plates in place after mating.

Figure 3:
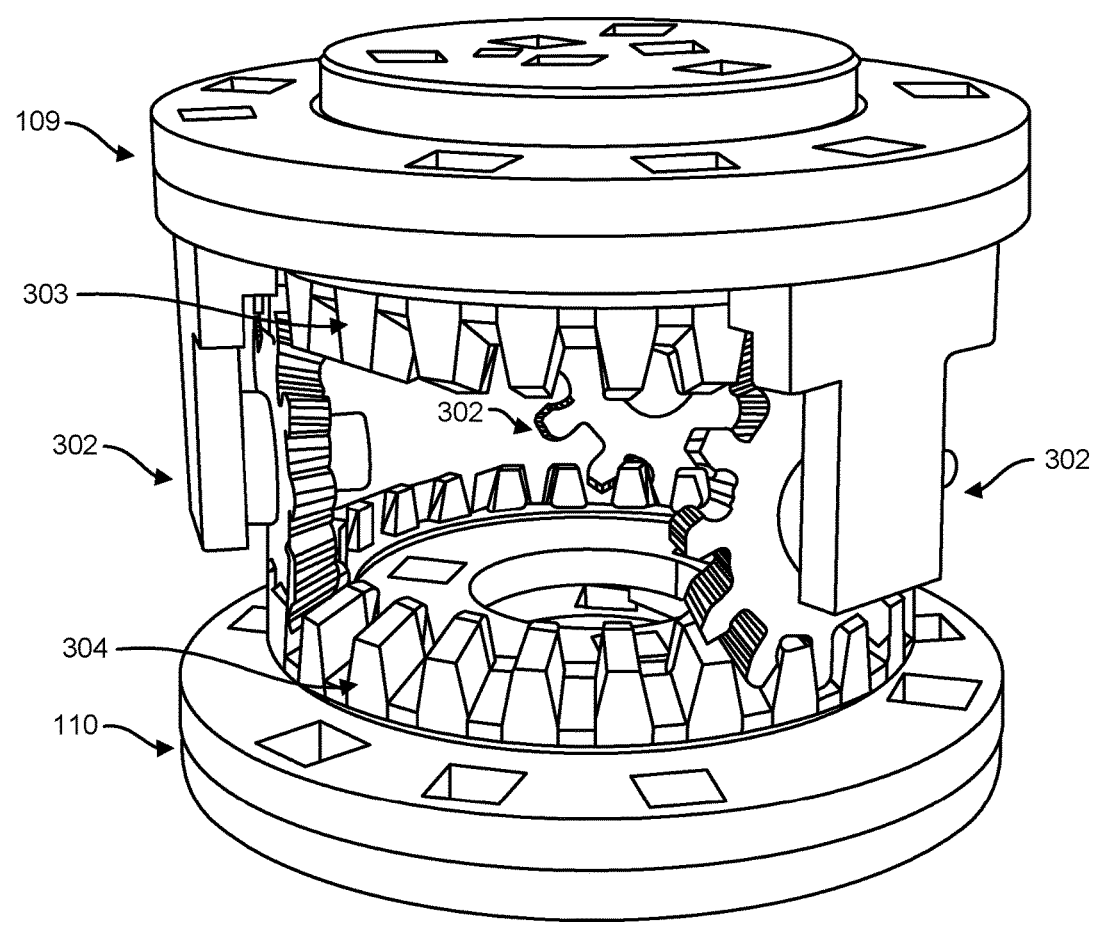
Figure 4:
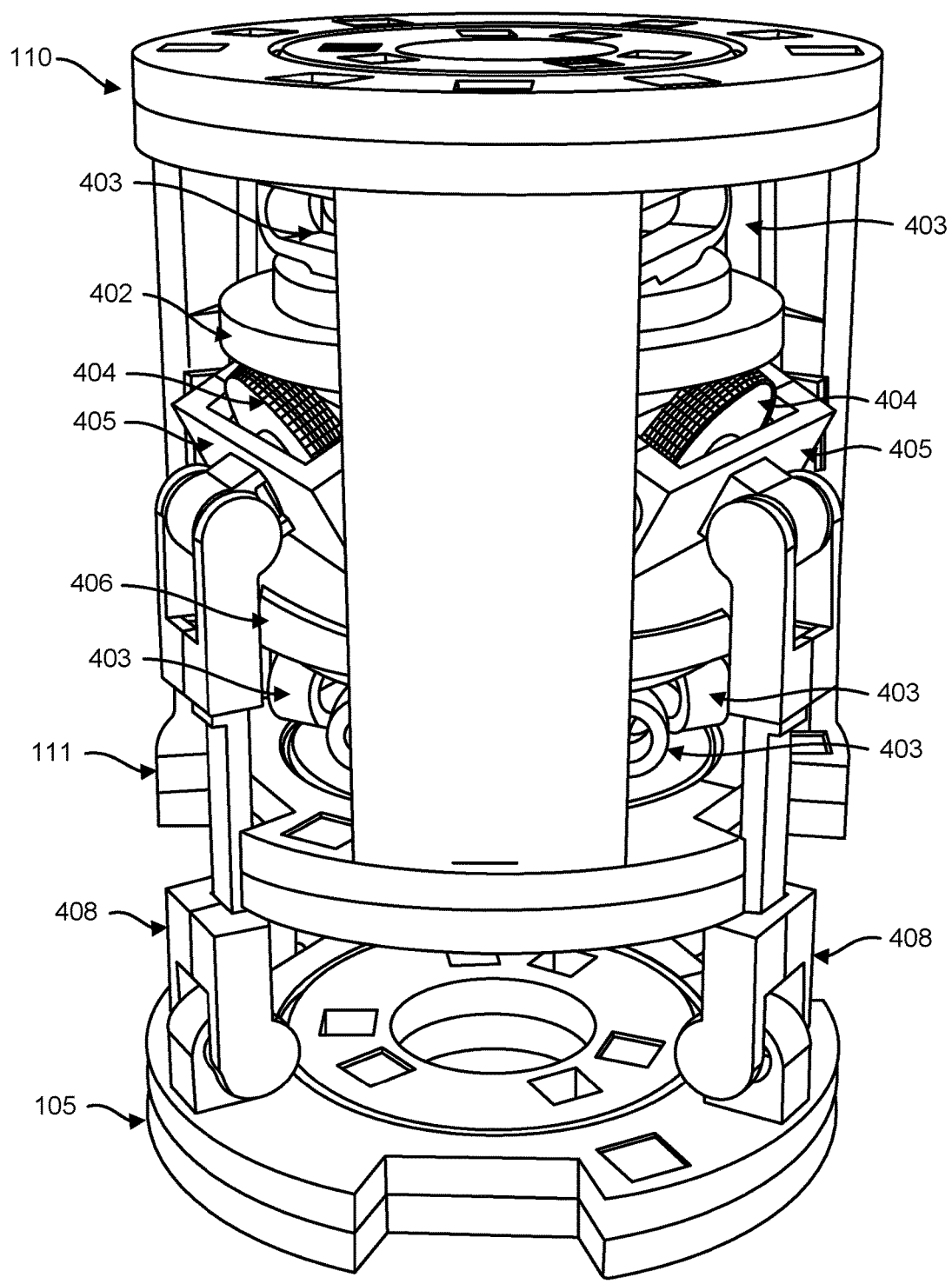

FIG. 3 shows in more detail of an embodiment of the present invention using a differential gear set. The differential gear set comprises two sun gears 303 and 304 and three planetary gears 302. Sun gear 303 is rigidly attached to the articulated drive shaft. Sun gear 304 is rigidly attached to the variator and rotates in the opposite direction as sun gear 303 with a speed either slightly higher, the same, or slightly lower. The axles of planetary gears 302 are rigidly attached to the outer race of ball bearing 109. This outer race rotates at the speed which is the difference of the speeds of sun gears 303 and 304. This outer race rotates relatively slowly either one direction or the other, or stays motionless of the speeds of the sun gears match. The outer race of ball bearing 110 is fixed relative to the female twist-lock plate of the lower arm segment FIG. 4 shows in more detail an embodiment of the toroidal variator and the sliding ball bearing that causes the tiltable wheels to tilt inward or outwards. The upper ball bearing 110 is the same as ball bearing labeled 110 in FIG. 3. The toroidal variator comprises two toroidal surfaces 402 and 406, and three simultaneously tiltable wheels 404. As wheels 404 tilt they maintain contact with both toroidal surfaces 402 and 406. Toroidal surface 406 is rigidly attached to the articulated drive shaft. Toroidal surface 402 rotates in the reverse direction at a speed which is either higher, the same, or lower than the speed of the articulated drive shaft, depending on the angles of the tiltable wheels 404. Toroidal surface 402 is pressed downwards towards tiltable wheels 404 by three springs 403. These springs also rigidly connect toroidal surface 402 to the inner race of ball bearing 110. Toroidal surface 406 is pressed upwards towards tiltable wheels 404 by three springs 403. These springs also rigidly connect toroidal surface 406 to the inner race of ball bearing 111. This inner race is rigidly connected to the articulated drive shaft.

The toroidal surfaces 402 and 406 make frictional contact with the surfaces of tiltable wheels 404. These surfaces are of appropriate clutch material to provide adequate traction, and a variety of different materials may be used within the scope of this invention. Springs 403 may press these surfaces together with appropriate force. Jointly the surfaces on 402, 404, and 406, and the springs 403 comprise a clutch.

This clutch is actually a key component of the overall design. The traction of the clutch determines the ultimate amount of force the snake-arm assembly can apply to its external environment. Should the external resistance be insurmountable, this clutch may start slipping by design and no permanent damage will occur to the snake-arm assembly. However, this threshold of slippage is optional. In addition, this clutch is ultimately responsible for the variable rotation rate that determines the motion of the snake-arm assembly.

The tiltable wheels 404 may be mounted in gimbal frames 405. The gimbal frames are tilted simultaneously by tilt control arms 408 which are attached to sliding ball bearing 105. The inner race of the sliding ball bearing 105 is attached to the motor screw actuator (not shown in FIG. 4). The outer races of ball bearings 110 and 111 are rigidly connected to the female twistlock plate of the lower arm segment. The outer race of sliding ball bearing 105 stays fixed relative to the outer races of ball bearings 110 and 111, but is not rigidly attached since it slides. The top surface in this figure is understood that it may be toroidal, as shown in FIGS. 5 and 10.

Figure 5:
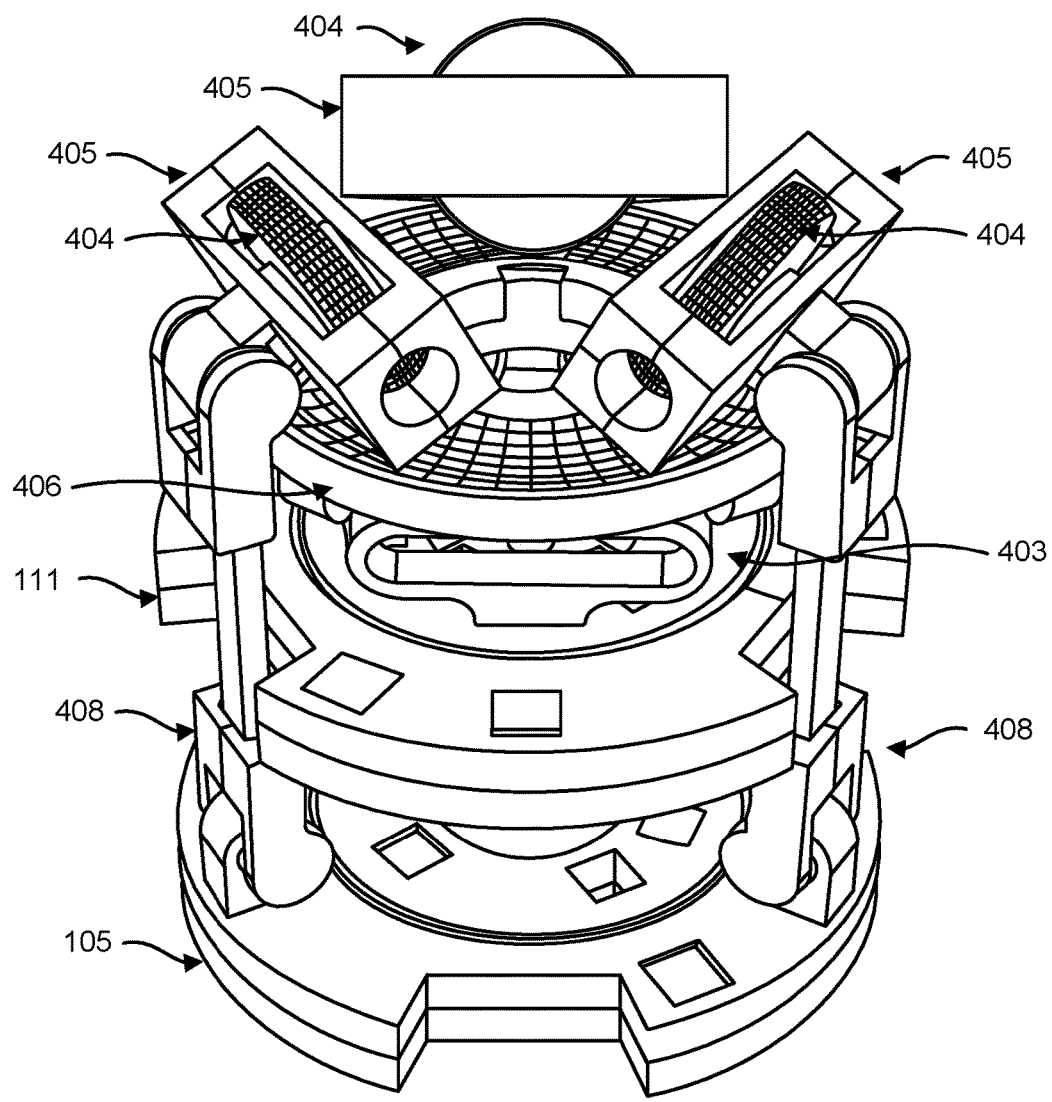

FIG. 5 shows an embodiment of the toroidal variator with several pieces removed for clarity, including the top plate of the toroid. The three tiltable wheels 404 are held within their gimbal frames 405. The lower toroidal surface 406 can be more clearly seen. Three springs 403 connect lower toroidal surface 406 to the inner race of ball bearing 111. Three tilt control arms 408 connect the gimbal frames 405 to the outer race of the sliding ball bearing 105. The graphed lines of the top surface in this figure indicates that this is a curved toroidal surface.

Figure 6:
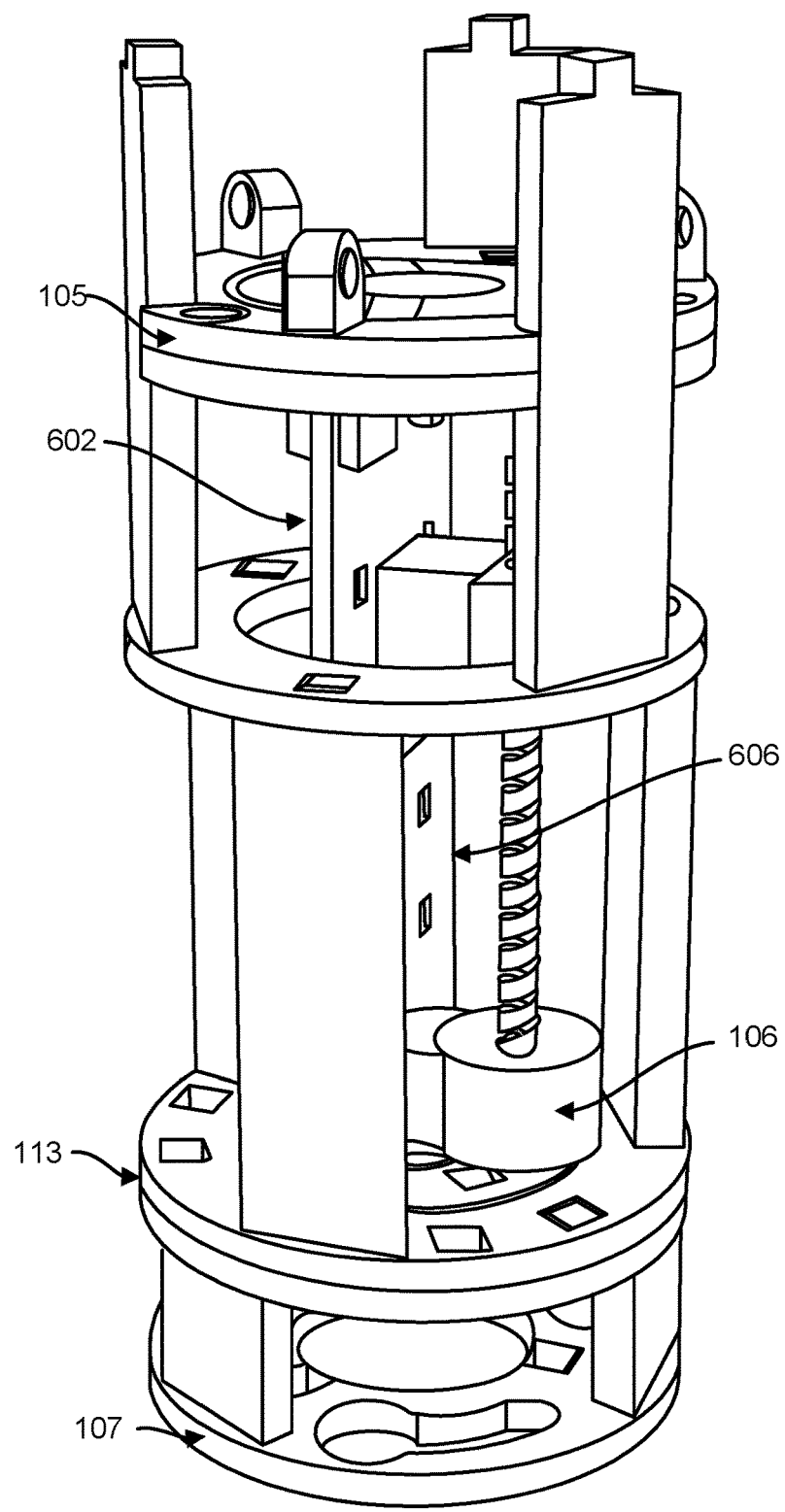

Turning to FIG. 6, this figure shows an embodiment of the motor screw actuator 106. This actuator is controlled by circuitry on a printed circuit board (not shown) that may be mounted on lower flat plate 606, or in a remote location. The controlling circuitry can cause the motor screw actuator to drive upper flat plate 602 either upwards or downwards. Upper flat plate 602 is rigidly connected to the inner race of sliding ball bearing 105 which ultimately determines the angle of the tiltable wheels (not shown in FIG. 6). Lower flat plate 606 is rigidly connected to the inner race of ball bearing 113, and to the articulated drive shaft. The motor screw actuator 603, lower flat plate 606, the control printed circuit board, upper flat plate 602 and the inner race of sliding ball bearing 105 all rotate along with the articulated drive shaft. Female twist-lock plate 107 is rigidly connected to the outer race of ball bearing 113, and ultimately to the outer races of the higher ball bearings (not shown in FIG. 6).

Figure 7:
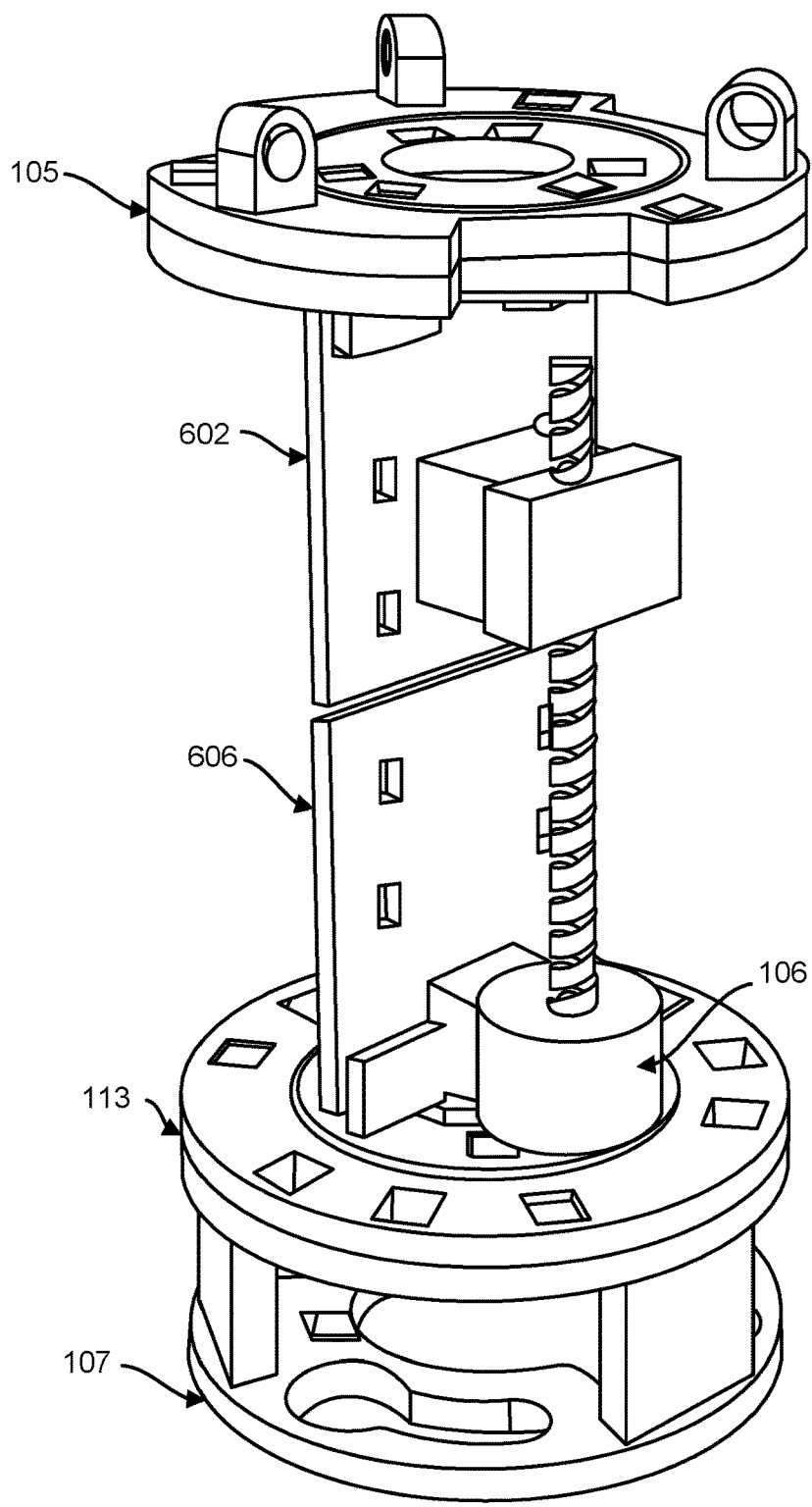

FIG. 7 shows the motor screw actuator 106 and the sliding ball bearing 105 with several pieces removed for clarity. The inner race of sliding ball bearing 105 may be rigidly connected to upper flat plate 602. The motor screw actuator 106 may be rigidly attached to lower flat plate 606 and to the inner race of ball bearing 113. The outer race of ball bearing 113 is rigidly connected to the female twist-lock plate 107.

FIG. 8 shows in isolation the parts at the bottom of a snake-arm segment embodiment which are fixed relative to the female twist-lock plate 107 of the lower arm segment. These are: the female twist-lock plate 107, the outer race of ball bearings 113, 111 and 110, the outer race of sliding ball bearing 105, and the tiltable wheels with their gimbal frames and tilt control arms 408.

FIG. 9 shows in isolation the parts at the top of a snake-arm segment embodiment which are fixed relative to the male twist-lock plate 101. These are: the male twist-lock plate 101, the outer race of ball bearing 109, and the three planetary gears 302 of the differential gear set.

FIG. 10 shows in isolation the parts which rotate with (and comprise) the articulated drive shaft in one possible embodiment. These are: 102 the keyhole and the inner race of the upper-most ball bearing along with the upper differential gear, stiffeners 1002 (which have been hidden in all other figures), 406 the lower toroidal surface with its springs and the inner race of its ball bearing, 105 the inner race of the sliding ball bearing with the upper flat plate, 106 the motor screw actuator mounted on the lower flat plate and the inner race of its ball bearing, twisted wire flexible cable 1006 (speedometer cable), and key 108. When multiple snake-arm segments are joined to for a snake arm assembly, the key at the bottom of each snake-arm segment couples with the keyhole of the snake-arm segment below. Between each snake arm segment, the twisted wire flexible cable bends 45 degrees. Together these items comprise the articulated drive shaft. The graphed lines of the top surface in this figure indicates that this is a curved toroidal surface.

Figure 11:
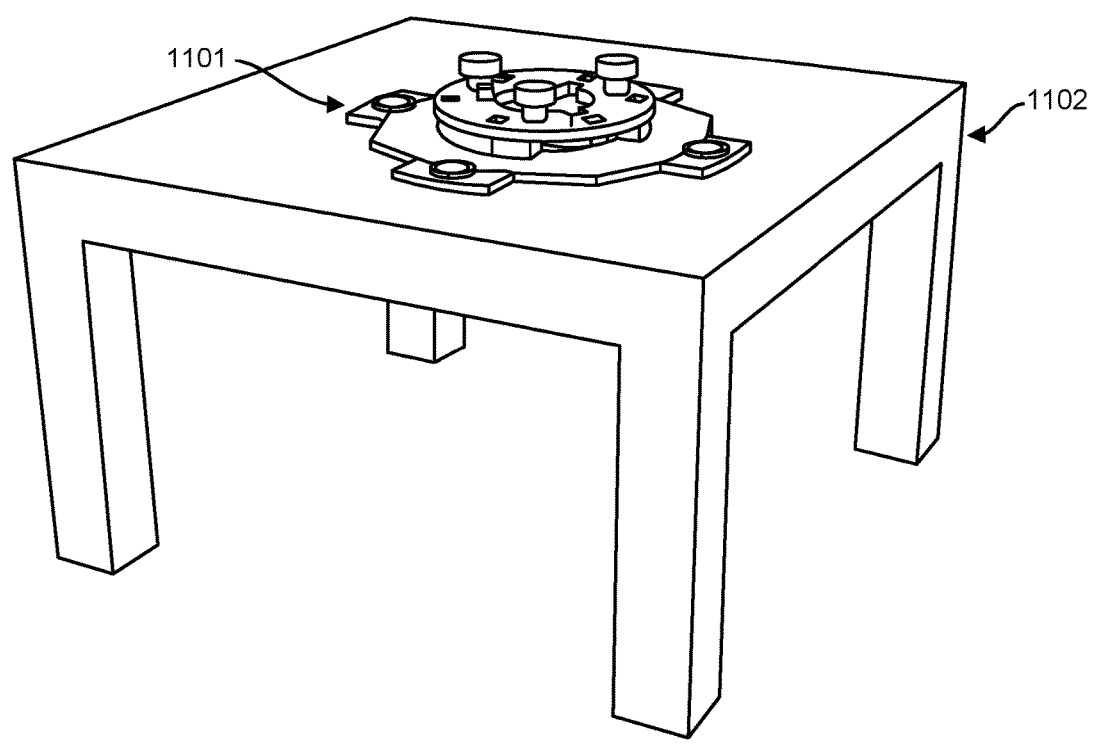
FIGS. 11, 12, and 13 show details of a fixed base of the snake-arm assembly, including the motorized turn-table upon which a battery and a control computer rotate along with the articulated drive shaft.

FIG. 11 shows the base table that is positioned under the entire snake-arm assembly. This base table comprises a firm surface with legs 1102 rigidly attached to the floor or otherwise remaining relatively fixed, and a male twist-lock plate 1101, attached to base table 1102, which mates with the bottom female twist-lock plate of the bottom snake-arm segment. However, a number of other bases or attachments are possible with this invention and arm.

Figure 12:
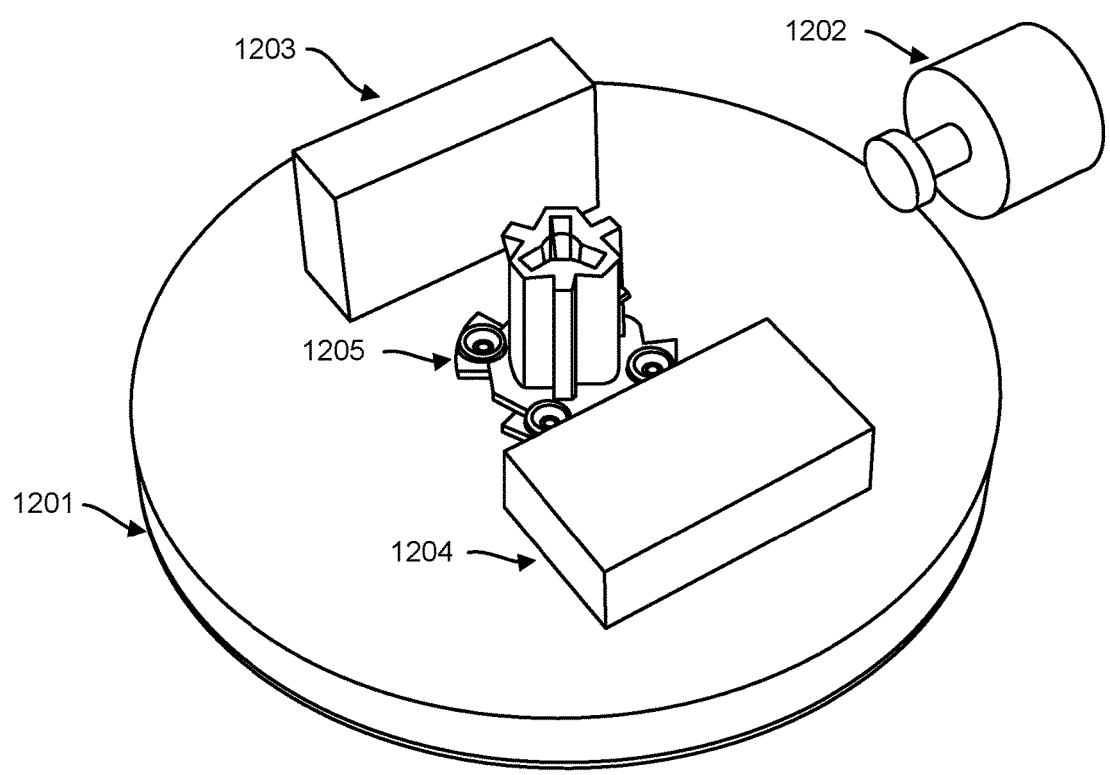

FIG. 12 shows an embodiment with a motorized turntable which may ultimately drive the articulated drive shaft. Turn-table 1201 sits on a planar ball-bearing (lazy susan bearing) whose lower surface is rigidly attached to the floor or otherwise remains relatively fixed. Turntable 1201 is rotated by the force of main motor 1202 which is also rigidly attached to the floor. Main motor 1202 ultimately drives the rotation of the entire articulated shaft that runs the length of the snake-arm assembly, and so this motor must provide sufficient torque to animate the entire snake arm. FIG. 12 shows a drive wheel on the shaft of motor 1202, which contacts turn-table 1201. The surface of the drive wheel and the contacted surface of the turn-table are textured to provide adequate traction. For very long snake-arm assemblies where high torque is required, to increase traction the drive wheel can have gear teeth on its surface, and mating crown gear teeth can be cut into the surface of the turn-table. Keyhole 1205 mates with the key at the end of the flexible cable at the bottom of the lowest snake arm segment.

Control computer 1204 communicates with all the control logic printed circuit boards through the length of the snake arm assembly (either by connectorized wire segments or using wireless radio). In various embodiments of this invention, electrical connections could be made through wires that run through the snake arm, through connections in each segment that transmit signals from segment to segment, or any other electrical method known in the art. In yet another embodiment, electrical control could be through wireless signals to each segment controller, such as Bluetooth, 802.11 wi-fi, or other wireless methods known in the art. Control computer 1204 also communicates with the operator of the snake-arm assembly via wireless radio. Battery 1203 provides electrical power for control computer 1204 and also for all the motor screw actuators and their control logic printed circuit boards in the snake arm assembly. Electrical power is passed from battery 1203 through each segment by means of connectorized cables. Since the motor screw actuators are small relative to main motor 1202, the power cables threading through the snake arm assembly are relatively thin. Although, as stated above, the arm may consist solely of sensors and actuators using wired power, while the controller and logic are held in an off-board computer.

Figure 13:
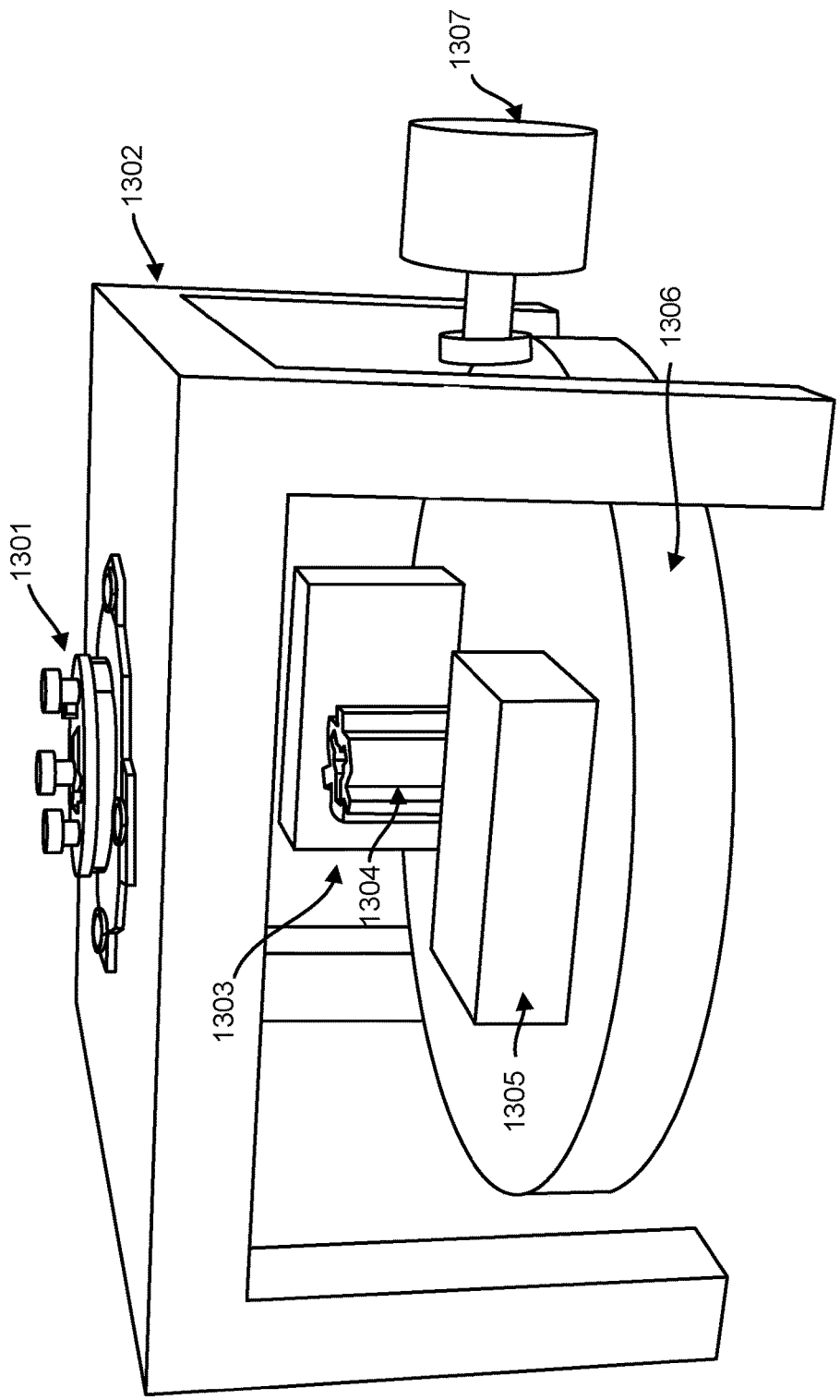

FIG. 13 shows the complete base assembly of the snake arm assembly. The base assembly comprises: base table 1302, male twist-lock plate 1301, turn-table 1306, keyhole 1304, main motor 1307, control computer 1305, and battery 1303.

Figure 14:
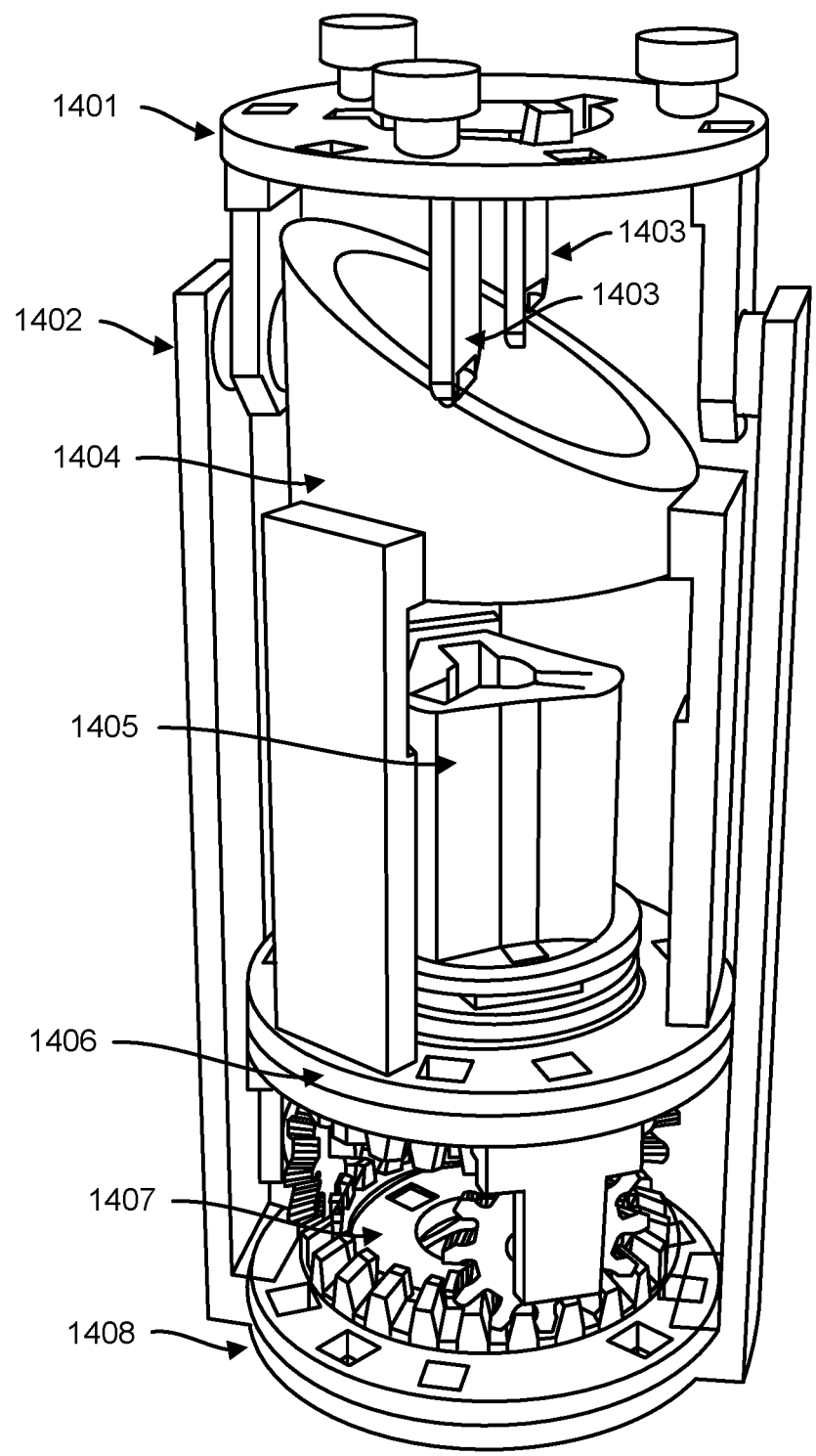
FIGS. 14 and 15 show an alternate embodiment of a single snake-arm segment. The modification allows the single joint to pivot rather than rotate. The result is that the angle of elevation, rather than the azimuthal angle, of the next higher snake-arm segment can be controlled.

FIG. 14 shows the top end of a snake-arm assembly that is modified so that the elevation angle is controlled rather than the azimuthal angle. With this modification, the male twist-lock plate 1401 is connected by pivots 1402 which are rigidly connected to the outer race of the ball-bearing 1408 at the bottom of the differential gear set 1406, and thus rigidly connected to the female twist-lock plate at the bottom of this snake-arm segment (not shown in FIG. 14). Obviously, it may be possible to adapt the design of this invention to control elevation angle, azimuthal angle, or any combination of the two. Stated differently, it may be possible to use the disclosed invention to control rotations of the segment body about various axes. These may include an axis along the length of the shaft, at angles perpendicular to the shaft, or any combinations thereof.

The outer race of ball bearing 1406 at the top of the differential gear set 1406 rotates either clockwise or counterclockwise depending on the angle of the tilting wheels of the toroidal clutch (not shown in FIG. 14). Instead of directly rotating the azimuthal angle of the male twist-lock plate at the top, with this modification a diagonally sliced cylinder 1404 is rotated. Two rolling contacts 1403 cause the male twist-lock plate 1401 to tip left or right, or stay motionless around the axis through pivots 1402. In this way the angle of elevation of the next higher snake-arm is controlled, while the azimuthal angle is fixed.

Keyhole 1405 is part of the articulated drive shaft. The key at the bottom of the next higher snake-arm segment is inserted into this keyhole when the next segment is attached. In this modified embodiment, the flexible cable of the key of the snake-arm segment above bends left or right, or is straight. In the preferred embodiment of FIG. 1, the flexible cable is always bent at 45 degrees.

Figure 15:
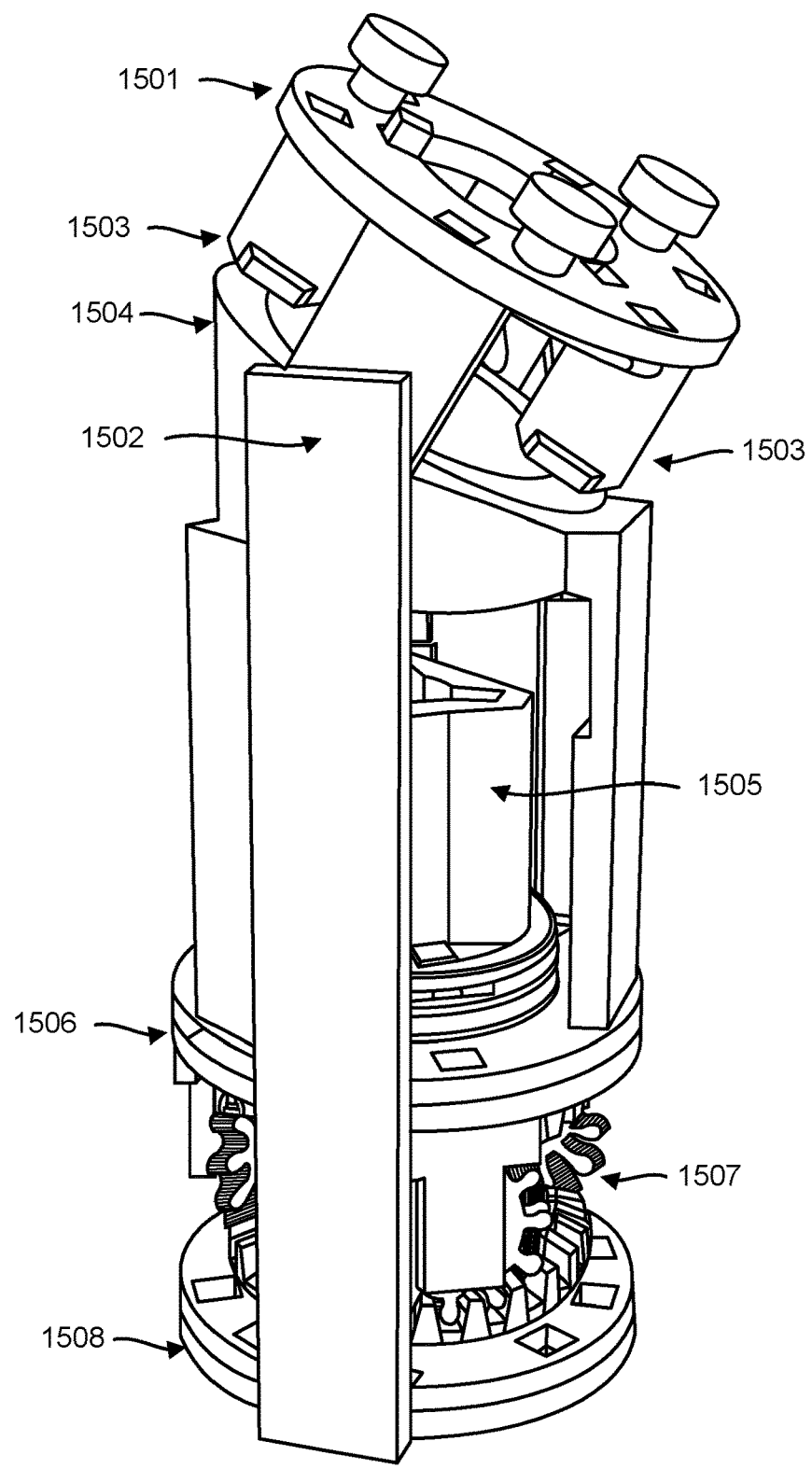

FIG. 15 shows the same top end of a modified snake-arm assembly after the outer race of ball bearing 1506 has rotated 90 degrees. The male twist-lock plate 1501 at the top has tilted on pivots 1502 because the diagonally sliced cylinder 1504 has rotated while touching rolling contacts 1503. Differential gear set 1507 and keyhole 1505 can be seen in FIG. 15 as well.

Figure 16:
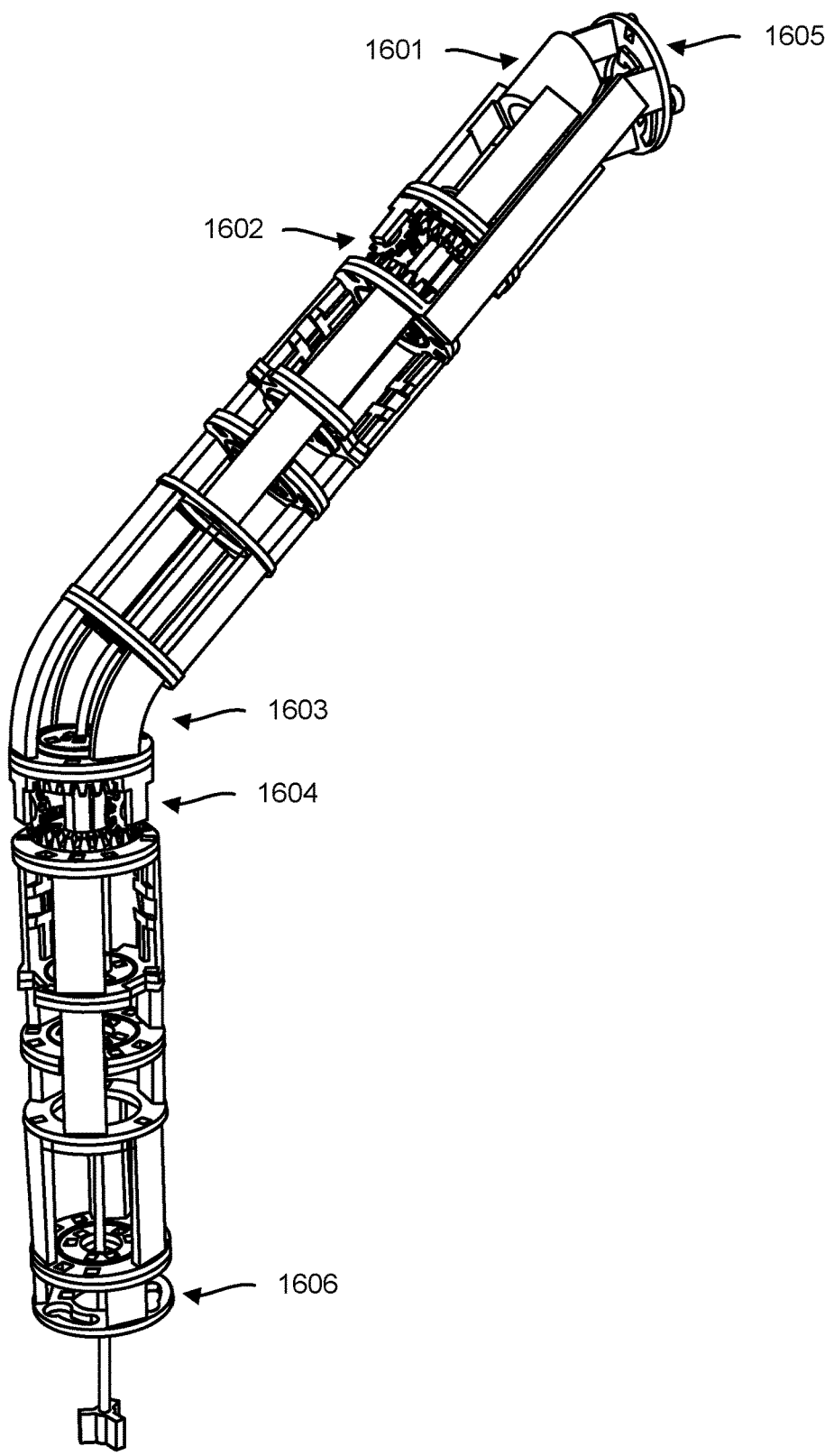
FIG. 16 shows an alternate embodiment of a single snake-arm segment that includes two toroidal variator clutch mechanisms, and allows control of both the angle of elevation and the azimuthal angle of the next higher snake-arm segment.

FIG. 16 shows another embodiment with a pair of snake-arm segments permanently fused together. The bottom half is itself a snake-arm segment of the azimuthal variety, and the top half is itself a snake-arm segment of the elevation variety. When fused together, they comprise a single snake-arm segment which controls both azimuth and elevation of the next higher snake arm segment (not shown in FIG. 16). At the top is male twist-lock plate 1605. Diagonally sliced cylinder 1601 rotates to control the angle of elevation of twist-lock plate 1605. Differential gear set 1602 performs the subtraction of rotational rates to control the angle of elevation. This figure shows an embodiment where the azimuthal angle is controlled (here by the 45-degree bend 1603) which is rotated by differential gear set 1604. The female twist-lock plate 1606 connects to the next snake arm segment below.

Not shown in FIG. 16 are the two toroidal clutches required to drive differential gear sets 1602 and 1604. In this double-action segment, only a single control circuit board may be used, but it must control both of the motor screw actuators that tilt the wheels in the two toroidal clutches.

Figure 17:
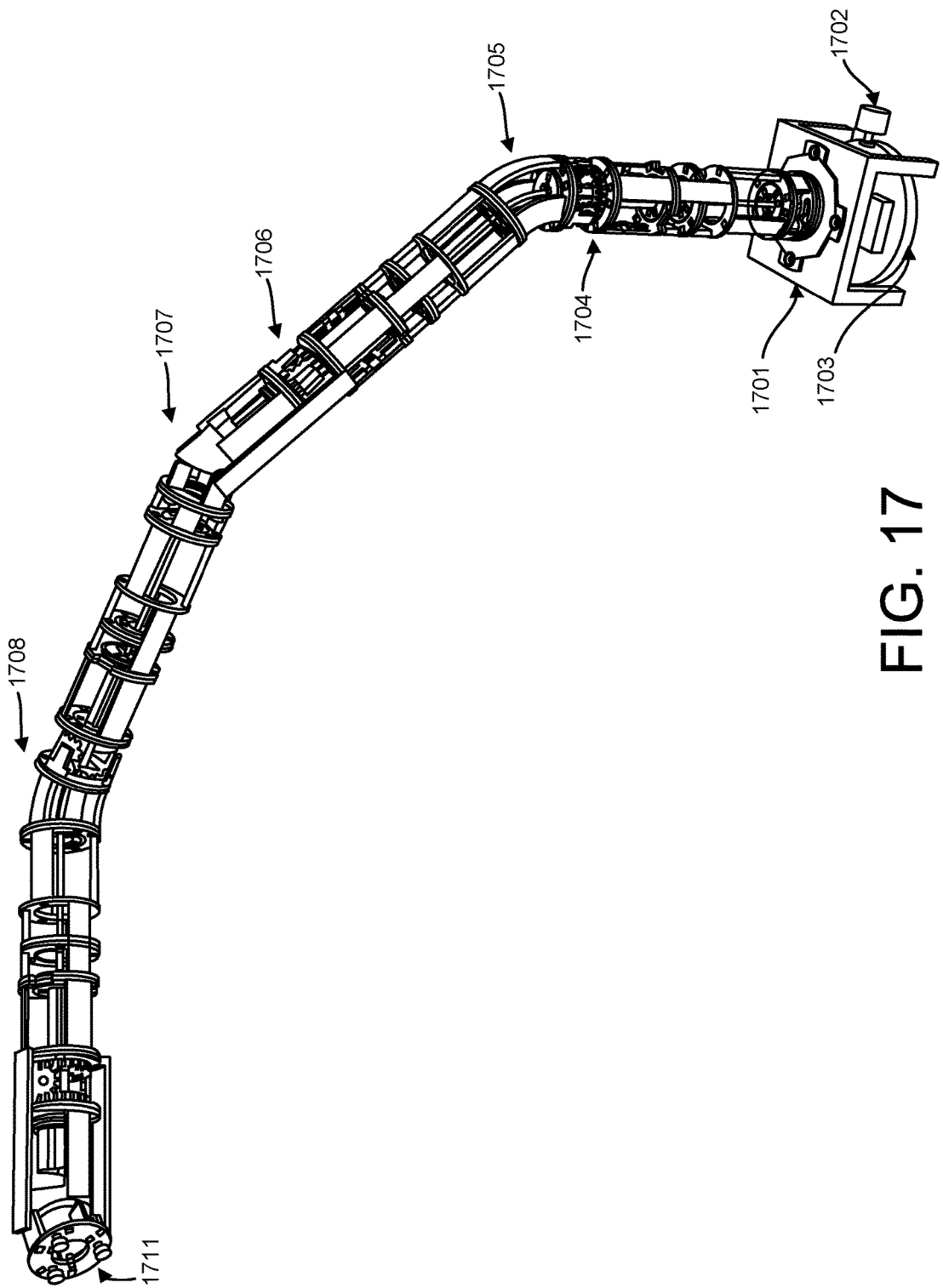
FIG. 17 shows an example snake-arm assembly mounted on a fixed base. This particular configuration shows two double-control snake-arm segments as in FIG. 16. Much longer snake-arm assemblies are possible, and can be comprised of an assortment of snake-arm segments of any of the three embodiments.

FIG. 17 shows an entire snake-arm assembly mounted on a base assembly. Only a few snake arm segments are shown in this figure, but longer snake-arm assemblies are possible. The base assembly table 1701, main motor 1702, and turn-table 1703 may remain fixed on the ground. Differential gear set 1704 causes the 45-degree (or other angle) bend 1705 to change azimuthal angle. Differential gear set 1706 rotates diagonally sliced cylinder 1707, adjusting the elevation of the next snake-arm segment. Differential gear set 1708 causes the 45-degree bend 1709 to change azimuthal angle. Differential gear set 1710 rotates diagonally sliced cylinder 1711, adjusting the elevation of the final twist-lock plate.

Figure 18:
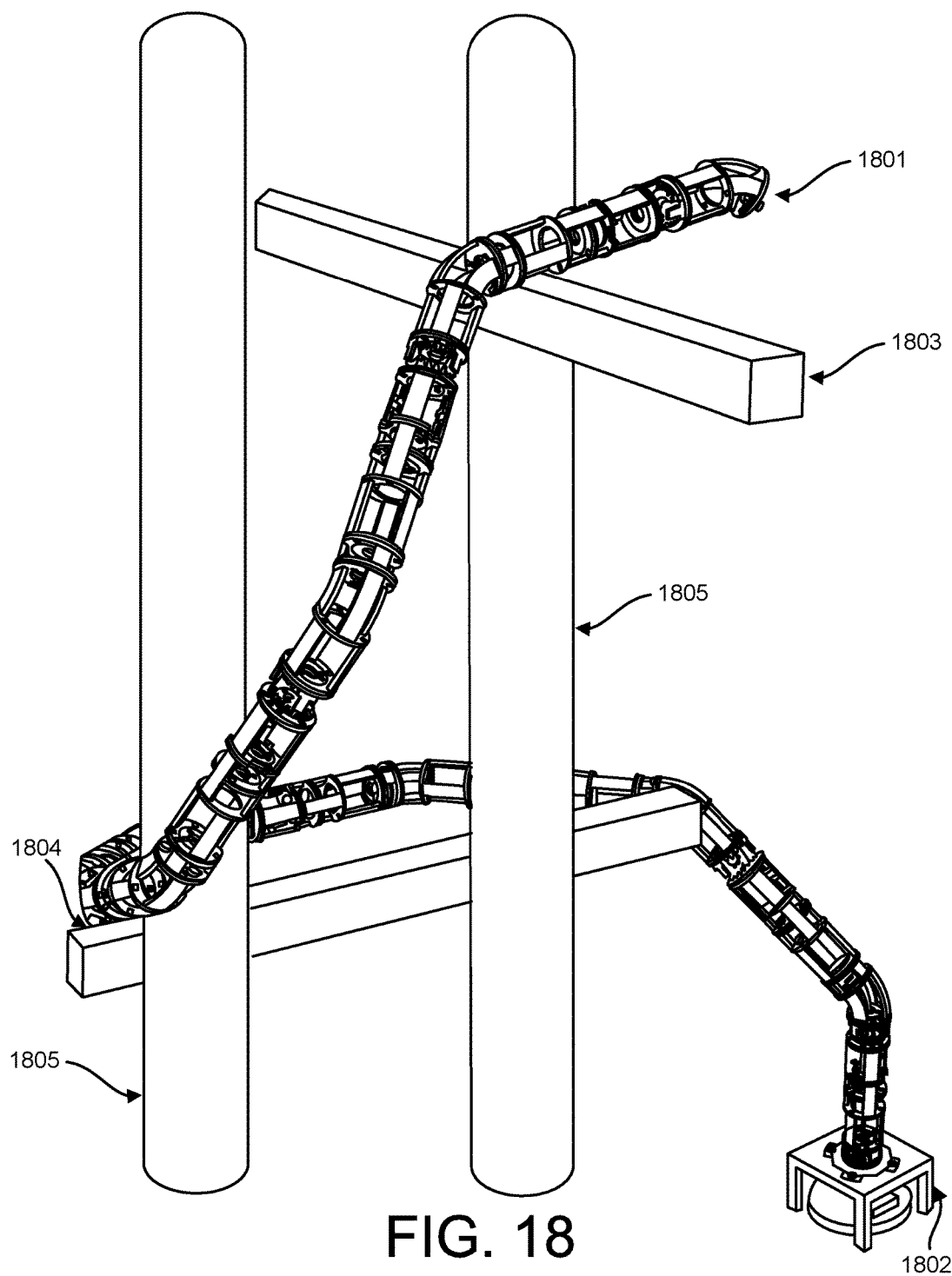
FIG. 18 shows an example snake-arm assembly with 9 snake-arm segments of the FIG. 1 preferred embodiment variety mounted on a fixed base. This snake-arm assembly has ascended an obstacle, taking advantage of external points of support.

FIG. 18 shows a longer snake-arm assembly comprising 9 snake-arm segments of the preferred embodiment shown in FIG. 1, though any various number of segment bodies may be used. The highest end of snake-arm assembly 1801 has ascended around an obstacle consisting of cross-beams 1803 and 1804 and two poles 1805. In this configuration the weight of the snake-arm assembly 1801 may be partially supported by points of contact with cross beams 1803 and 1804, with the rest of the support at the base 1802 of the snake-arm assembly.

In the preferred embodiment, torque from the motor is applied to the key at the bottom of the arm segment 1007. This force may cause most or all parts shown in FIG. 10 to rotate at the speed of the motor. This includes the lower toroidal surface 406, the upper differential sun gear 303, and the keyhole 1001. All the parts shown in FIG. 10 are rigidly attached and rotate in unison. The keyhole 1001 provides torque to the next higher arm segment. Less torque may be available for each higher arm segment, and so the ultimate length of the snake arm assembly may be limited by the torque provided by the base motor 1307 and the strength of the articulated drive shaft.

The rotation of the lower toroidal surface 406 causes the tiltable wheels 404 to spin on their axles. This causes the upper toroidal surface 402 to rotate in the opposite direction (relative to the female twist-lock plate 107 at the bottom of the segment), at a speed either less than, or the same as, or faster than the rotational speed of the lower toroidal surface 406, depending on the angle of the tiltable wheels 404. The upper toroidal surface 402 may be rigidly connected to the lower differential gear 304. These parts both rotate in unison in reverse direction.

In this embodiment, within the differential (FIG. 3), the top differential sun gear 303 and the bottom differential sun gear 305 are rotating in opposite directions (relative to the female twist-lock plate 107 at the bottom of the segment), but not necessarily at the same speed. The vertical planetary gears 304 of the differential spin on their axles but also are driven to orbit around the drive shaft in proportion to the difference of the rotational speeds of the sun gears 303 and 305. In the case the tiltable wheels are perfectly vertical, the rotational speeds match and the differential planetary gears 304 remain locked in position relative to the female twist-lock plate 107 at the bottom of the segment. The rotation clockwise or counter-clockwise (or lack of rotation) of the differential planetary gears 302 causes the male lock-plate 202 and all higher arm segments to rotate in unison, thereby repositioning all higher arm segments, or holding them in place.

In yet an alternate embodiment, the depth of the teeth in the gears of the differential may be reduced to zero, and friction between these parts transfers power rather than the engagement of the gear teeth. In this case, the differential sun gears 303 and 305 may be replaced with duplicates of the toroidal surfaces 402 and 406, and the differential planetary gears may be replaced with duplicates of the tiltable wheels 404 (but may be locked so that they are permanently vertical and no tilting is allowed). Springs similar to the springs 403 in the toroidal clutch must be added to press the differential top and bottom together. This substitution advantageously reduces the count of unique parts.

In practice, it may be difficult to position the tiltable wheels perfectly vertically. As a result, there may always be a slight motion of each arm segment joint. In this case, the microcontrollers may constantly monitor slight deviations and make slight adjustments in the angle of the tiltable wheels to compensate. As a result, there may always a slight dither to the over shape of the snake arm assembly. But, the control system may be designed to compensate for this motion. It may also possible to stop the motor in the base to freeze the positions of all joints in the overall snake arm assembly if the slight dither is disadvantageous for the application.

In yet another alternate embodiment, an additional clutch mechanism may be used to lock the motion of the arm segment, freezing the upper male twist-lock plate in position relative to the lower female twist-lock plate. In this embodiment there would be no slight dither to the overall snake arm assembly shape.

A variety of different sensors may be integrated into the control of the system. For example, sensors and encoders, such as for position, angle, orientation (using a gyroscope or other similar sensor), acceleration, or force, may be integrated into each segment body for feedback control of the segment body position or orientation. Similarly to the control of the clutch actuator, these sensors may be communicated with using wires or hard connections in each body, or they may use wireless communication. In addition, the actuator used to control the orientation mechanism and clutch may be any type of actuator known in the art: a motor, linear actuator, or any other similar device to control the clutch and mechanism. Alternatively, these clutches may be actuated mechanically.

In one possible embodiment, main motive force is in base rather than in the arm assembly. Only very small actuator motors are required in the arm assembly. This may make the arm assembly lighter and/or narrower. Rotational joints may be held in place by clutch friction within the toroidal variator. Thus, if overwhelming force is applied externally to the arm assembly, the joints may gracefully yield without damage. In another embodiment, a brake, or similar device, may be actuated within a segment body to fix or set the position and angle of a segment.

The rotation of the articulated drive shaft can be stopped, leaving the arm assembly in position. No, or little, power may be consumed in this state. The articulated drive shaft may rotate only in one direction. This is particularly true for an embodiment where there are opposite, or opposing, clutches designed to provide reversed rotation of the arm segment body while still using only one rotation direction of the shaft. Thus, in this embodiment, lighter thinner shaft material may be used (rather than bidirectional flexible shafts). Even though the articulated drive shaft rotates in only one direction, each of the joints along the snake-arm assembly can independently rotate in either direction, or stay fixed. However, one may use a bidirectional shaft for reversed shaft rotation within the scope of the present invention. For the purposes of this disclosure, "shaft" may refer to a variety of different technologies, including a flexible shaft (bidirectional or unidirectional), a series of inflexible shafts that are connected to each other (as through universal joints), or any other shaft coupling technology known in the art.

Electrical power for the small actuator motors can be provided by a pair of wires threaded alongside the articulated rotating shaft. Since these motors may be small, only thin wires may be required. Electrical power may be supplied from a battery within the rotating base, a wired power source, or a wireless power source. Alternatively, rotating brush and ring contacts can be used to provide electrical power to the rotating core.

Control signals for the microcontrollers that control the small actuator motors can be provided by a pair of wires threaded alongside the articulated rotating shaft, parallel to the electrical power wires. Control signals can originate from a computer within the rotating base, or remotely. Commands from the human operator can be delivered to the rotating computer most easily using wireless radio signals. Each microcontroller PCB can have accelerometer devices or other sensors to determine the position in space of each arm segment. This information can be sent back to the main computer within the rotating base using the same pair of wires that carries the other control signals.

The snake-arm segments can be covered with skins to protect the inner mechanisms from external contaminants. The snake-arm assembly may be comprised of interchangeable snake-arm segments. Defective segments can be removed and replaced as the wiring is connectorized and the twist-lock plates can be un-twisted and the keys can be pulled out of their keyholes. After reassembly, the control computer in the base can communicate with each of the segment controllers, and determine the order of the segments in the assembly.

It is worth noting that the rotational speed of the articulated drive shaft may be much faster than the speed at which the arm-segments elevation and azimuth adjust. As a non-limiting example, if the articulated drive shaft is turning about 10 times per second, a full 360-degree rotation of a bent joint between segments can be performed in about one second. Higher or lower speeds can be used depending on the size and weight of the snake-arm assembly. The ultimate length of the snake-arm assembly is limited only by the strength and weight of the materials used, and the maximum force the toroidal clutches can provide.

Advantageously, the shape snake-arm assembly can be configured by the operator (or non-human control system) to distribute the weight of the assembly on opportunistic points of external support. For example, the base of the snake-arm assembly can be placed near the trunk of a tree, and the snake arm can be directed to spiral up around the tree trunk, hanging on side branches, as the top end of the snake-arm assembly ascends. For this embodiment, force sensors in each segment may assist with such control. In yet another embodiment, tools or cameras or video cameras or manipulators can be attached to the top-most snake-arm segment.

Any combination of the above features and options could be combined into a wide variety of embodiments. It is, therefore, apparent that there is provided in accordance with the present disclosure, systems and methods for designing and implementing snake arm systems. While this invention has been described in conjunction with a number of embodiments, it is evident that many alternatives, modifications, and variations would be, or are apparent to, those of ordinary skill in the applicable arts. Accordingly, applicants intend to embrace all such alternatives, modifications, equivalents and variations that are within the spirit and scope of this invention.

The invention claimed is:

1. A robotic arm assembly comprising:
   a plurality of arm segments, wherein the plurality of arm segments are connected by joining arm segments end-to-end;
   a rotating articulated shaft passing through the plurality of arm segments;
   a clutch in each of the plurality of arm segments configured to selectively clutch a body of each of the plurality of arm segments to a rotation of the rotating articulated shaft, wherein the clutch alters an orientation of each of the plurality of arm segments, wherein the clutch comprises a toroidal clutch, wherein the toroidal clutch is configured to generate a rotation opposite to the rotation of the rotating articulated shaft, and further wherein the toroidal clutch is configured to generate a variable rate of rotation, wherein the variable rate of rotation determines a motion for the robotic arm assembly; and
   a motor connected to a base of the robotic arm assembly, wherein the motor is configured to rotate the rotating articulated shaft.

2. The robotic arm assembly of claim 1, wherein the toroidal clutch comprises at least one toroidal surface, at least one tiltable wheel, and at least one spring.

3. The robotic arm assembly of claim 1, wherein each of the plurality of arm segments is configured to controllably rotate clockwise or counter-clockwise an azimuth angle of a connected arm segment, wherein the connected arm segment is further from the base of the robotic arm assembly than the respective each of the plurality of arm segments.

4. The robotic arm assembly of claim 1, wherein a computing element uses sensors to determine a configuration of movable joints in the robotic arm assembly and, responsive to the determination, controls an operation of each of the plurality of arm segments to make desired changes in an assembled configuration of the plurality of arm segments.

5. The robotic arm assembly of claim 1, wherein the base of the robotic arm assembly comprises a battery, wherein the battery provides electrical power to the plurality of arm segments.

6. The robotic arm assembly of claim 1, wherein the base of the robotic arm assembly comprises a wireless communication system operable to communicate with an operator of the robotic arm assembly to receive shape configuration commands and transmit information from sensors within the robotic arm assembly.

7. The robotic arm assembly of claim 1, wherein each arm segment comprises a male twist-lock plate and a female twist-lock plate, wherein a first and a second arm segment are joined end-to-end by mating the male twist-lock plate of the first arm segment to the female twist-lock plate of the second arm segment.

8. The robotic arm assembly of claim 7, wherein a key at an end of the second arm segment with the female twist-lock plate is configured to lock into a mating keyhole at an end of the first arm segment with the male twist-lock plate to further secure an end-to-end connection between the first and the second arm segment.

9. The robotic arm assembly of claim 1, wherein the toroidal clutch is controlled using an electric motor screw actuator.

10. The robotic arm assembly of claim 1, wherein each of the plurality of arm segments comprises a differential gear set, wherein the differential gear set is operable to allow a top part of a respective arm segment to move independently from a bottom part of the respective arm segment.

11. The robotic arm assembly of claim 10, wherein the differential gear set comprises at least one sun gear and at least one planetary gear.

12. The robotic arm assembly of claim 10, wherein a traction of the clutch determines an amount of force the robotic arm assembly can apply to an external environment.

13. The robotic arm assembly of claim 12, wherein the clutch is configured to slip if the robotic arm assembly encounters an insurmountable resistance in the external environment.

14. The robotic arm assembly of claim 1, wherein the toroidal clutch comprises:
    two toroidal surfaces, wherein a first toroidal surface is configured to attach to the rotating articulated shaft, and a second toroidal surface is configured to rotate in a reverse direction from the rotating articulated shaft;
    a plurality of tiltable wheels configured to maintain frictional contact with the two toroidal surfaces; and
    a plurality of springs configured to press the two toroidal surfaces towards the plurality of tiltable wheels.

15. The robotic arm assembly of claim 14, wherein a speed of rotation of the second toroidal surface depends on an angle of the plurality of tiltable wheels.

16. The robotic arm assembly of claim 14, wherein each of the plurality of tiltable wheels is mounted in a gimbal frame.

* * * * *